W. GILMAN.
CORN-PLANTER.
No. 186,203. Patented Jan. 16, 1877.
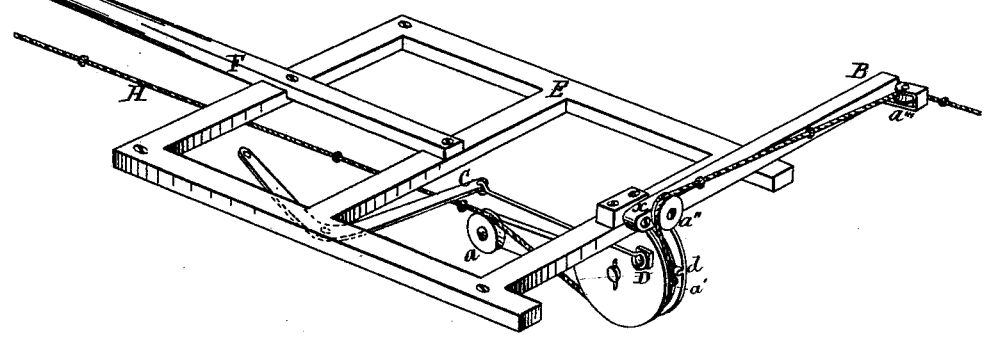
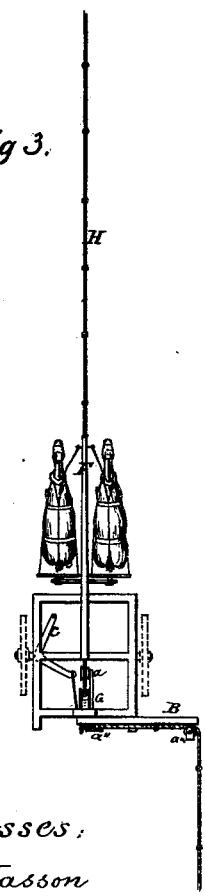
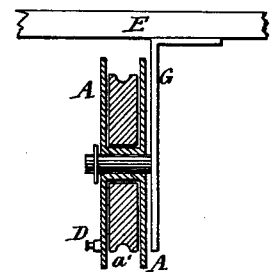
Witnesses:
W. B. Masson
W. R. Edelen
Inventor:
William Gilman
by E. E. Masson
atty.

UNITED STATES PATENT OFFICE.

WILLIAM GILMAN, OF CHICAGO, ILLINOIS.

IMPROVEMENT IN CORN-PLANTERS.

Specification forming part of Letters Patent No. 186,203, dated January 16, 1877; application filed June 17, 1876.

*To all whom it may concern:*

Be it known that I, WILLIAM GILMAN, of the city of Chicago, in the county of Cook and State of Illinois, have invented a new and useful Improvement in Corn-Planting Machinery, which improvement is fully set forth in the following specification, reference being had to the accompanying drawings.

The object of my invention is to automatically drop the corn in check-rows without any previous marking of the ground, by attaching it to any of the ordinary two-horse corn-planting machines now in use, said invention being illustrated more in detail by reference to the accompanying drawings—

Figure 1 representing a plan view, Fig. 2 a vertical section, and Fig. 3 a top view, of the machine.

It has not been deemed necessary to show the corn-planting machine in order to fully understand the nature and working of said invention.

A rope, (represented in the drawing at H, Fig. 1,) with knots placed upon it the same distance apart which it is desired to plant the hills of corn, is stretched across the field to be planted, and secured at the ends in the ordinary way, said rope being placed on the ground between the horses, and directly under the tongue of the planter, so as to serve as a guide or mark by which to drive the planter, instead of making marks upon the ground for that purpose. The rope is taken up by the sheave or pulley $a$, passes half-way around the sheave $a'$, and is thence, by means of sheaves $a''$ $a'''$ on the carrier-bar B, carried toward the field, and placed upon the ground sufficiently in advance of its former position for the return trip of the planter. The sheave $a'$ is a loose pulley running between two connected flanges or disks, A A, journaled to a downwardly-depending arm, G, as shown in the sectional drawing. The knots on the rope, in passing around $a'$, come in contact with lugs $d$, placed on the inside surfaces of the disks A A, near their circumference, each knot in such passage causing said disks to make one-half of a revolution. A crank-pin, D, is so placed upon one of said disks as to impart the proper motion to the dropping device or machinery of the corn-planter, by means of the connecting-rod and bell-crank C, so that the corn is dropped at the passage of each knot over said sheave $a'$. The length of the carrier-bar B is made to correspond with the number of rows planted at one time by the planter, so as to carry the rope the proper distance toward the unplanted field, and is so attached at $x$ as to be reversible, for the purpose of always carrying the rope in the proper direction.

I claim as my invention—

1. The pulleys or guides $a\,a'$, for taking up the operating-rope H from the ground forward between the horses, and centrally beneath the tongue F of the planter, to serve as a guide for driving, in combination with the reversible carrier B, located in the rear of the machine, substantially as shown and described.

2. The combination of the two disks A, rigidly connected, and having lugs $d$, with loose pulley $a'$, knotted cord, and connecting devices, for imparting motion to the grain-dropping mechanism, substantially as set forth.

3. The reversible carrier B, located in the rear of the machine, to transfer the rope to one side of it, in combination with the pulley $a'$, located centrally under the frame, as and for the purpose described.

WILLIAM GILMAN.

Witnesses:
O. L. TARRISH,
DAVID M. HILLIS.